United States Patent
Harakawa et al.

(10) Patent No.: US 6,716,909 B2
(45) Date of Patent: Apr. 6, 2004

(54) WATER-BORNE COATING COMPOSITION AND METHOD OF FORMING MULTILAYER COATING FILM

(75) Inventors: Tsuyoshi Harakawa, Yawata (JP); Masaru Murayama, Kagoshima (JP); Shinnji Seo, Hirakata (JP); Naohiro Tsuji, Anjo (JP)

(73) Assignee: Nippon Paint Co., Ltd., Osaka (JP)

( * ) Notice: Subject to any disclaimer, the term of this patent is extended or adjusted under 35 U.S.C. 154(b) by 306 days.

(21) Appl. No.: 09/944,199

(22) Filed: Sep. 4, 2001

(65) Prior Publication Data
US 2002/0077410 A1 Jun. 20, 2002

(30) Foreign Application Priority Data

Sep. 1, 2000 (JP) ........................ 2000-265208
Sep. 1, 2000 (JP) ........................ 2000-265209

(51) Int. Cl.⁷ .............................. C08J 3/00; C08K 3/20; C08K 5/38; C08L 75/00; B05D 3/02
(52) U.S. Cl. ............ 524/591; 427/372.2; 427/385.5; 427/402; 427/407.1; 428/423.1; 428/500; 524/589; 524/590; 524/507; 524/839; 524/840; 524/201
(58) Field of Search ............ 427/372.2, 385.5, 427/402, 407.1; 428/423.1, 500; 524/507, 589, 590, 591, 839, 840, 201

(56) References Cited

U.S. PATENT DOCUMENTS

| | | | |
|---|---|---|---|
| 4,327,008 A | * | 4/1982 | Schimmel et al. |
| 5,064,695 A | | 11/1991 | Hotta et al. |
| 5,204,404 A | | 4/1993 | Werner, Jr. et al. |
| 5,286,569 A | | 2/1994 | Werner, Jr. et al. |

FOREIGN PATENT DOCUMENTS

| | | |
|---|---|---|
| EP | 0421609 A2 | 4/1991 |
| JP | 7048537 A | 2/1995 |
| JP | 7048538 A | 2/1995 |
| JP | 8-209059 | 8/1996 |

* cited by examiner

Primary Examiner—Patrick D. Niland
(74) Attorney, Agent, or Firm—Connolly Bove Lodge & Hutz LLP (57) ABSTRACT

The present invention provides a water-borne coating composition excellent in smoothness and film appearance.

A water-borne coating composition comprising:
an emulsion resin obtained by emulsion polymerization of an α,β-ethylenically unsaturated monomer mixture
and a urethane compound represented by the general formula (1) or (2):

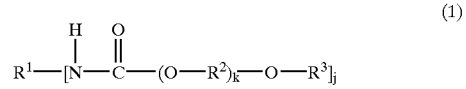

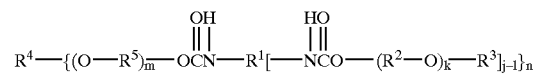

wherein the content of said urethane compound is 0.01 to 20% by weight on the solid basis relative to the resin solid in the coating composition.

A method of forming a multilayer coating film comprising: applying a water-borne base coating to an article to be coated and then applying a clear coating thereonto, followed by curing by heating,
wherein said water-borne base coating is the above-mentioned water-borne coating composition.

20 Claims, 1 Drawing Sheet

Fig.1

WATER-BORNE COATING COMPOSITION AND METHOD OF FORMING MULTILAYER COATING FILM

TECHNICAL FIELD

The present invention relates to a water-borne coating composition to be applied to automotive bodies and the like and a method of forming a multilayer coating film on automotive bodies and the like, more particularly, to a water-borne coating composition and a method of forming a multilayer coating film both giving coating films excellent in smoothness and appearance.

BACKGROUND ART

In the art, coatings used for industrial purposes are so-called solvent-borne coatings and contain an organic solvent as a diluent. Thus, coatings contain an organic solvent or solvents in large amounts. In recent years, however, water-borne coatings in which organic solvent contained is reduced and water is used as a diluent have been developed from the environmental protection viewpoint.

As such water-borne coating, for example, in Japanese Kokai Publication Hei-07-53913, a water-borne coating composition is disclosed which comprises a resin obtained by at least partly neutralizing a polymer containing an amide group-containing ethylenically unsaturated monomer, an acidic group-containing ethylenically unsaturated monomer and a hydroxyl group-containing ethylenically unsaturated monomer and an aqueous dispersion of carboxyl group-containing acrylic resin particles.

Generally, the coating films obtained from the water-borne coating so far known have a problem in that they are poor in smoothness and appearance as compared with the conventional solvent-borne coating. In particular, in the case of the application to automotive bodies requiring excellent appearance, the coating films obtained from water-borne coatings containing a luster color pigment as a color component have a problem in that they are very poor in flip-flop property, smoothness and film appearance as compared with the solvent-borne coatings.

Accordingly, it is the object of the present invention to provide a water-borne coating composition excellent in smoothness and film appearance and, particularly when a luster color pigment is contained as a color component, excellent in flip-flop property.

SUMMARY OF THE INVENTION

The present invention provides a water-borne coating composition comprising an emulsion resin obtained by emulsion polymerization of an α,β-ethylenically unsaturated monomer mixture comprising not less than 65% by weight of a (meth) acrylate ester whose ester-forming moiety contains 1 or 2 carbon atoms and having an acid value of 3 to 50 and a urethane compound represented by the general formula (1) or (2):

in formulas, $R^1$, $R^2$, $R^3$, $R^4$ and $R^5$ may be the same or different and each represents a hydrocarbon group, $R^1$ represents a hydrocarbon group which may optionally have a urethane bond, $R^3$ represents a branched or secondary hydrocarbon group, n is a number not less than 2, j is a number not less than 1 in the general formula (1) or a number not less than 2 in the general formula (2) and k and m each is a number within the range of 1 to 500, wherein the content of said urethane compound is 0.01 to 20% by weight on the solid basis relative to the resin solid in the coating composition.

The present invention also provides a water-borne coating composition comprising a water-borne resin resulting from dissolving or dispersing a resin having an acid value of 10 to 100, a hydroxyl value of 30 to 200 and a weight average molecular weight of 4,000 to 2,000,000 in an aqueous medium by means of a neutralizing base and a urethane compound represented by the general formula (1) or (2):

wherein the content of said urethane compound is 0.01 to 20% by weight on the solid basis relative to the resin solid in the coating composition. Referring to the general formulas (1) and (2), it is preferable that $R^2$ and $R^5$, which may be the same or different, each is an alkylene group containing 2 to 4 carbon atoms or a phenylethylene group and that $R^3$ is a branched or secondary alkyl group containing 8 to 36 carbon atoms. The composition comprises a color component.

The composition comprises a polyether polyol having not less than 0.02, on average, of a primary hydroxyl group per molecule, a number average molecular weight of 300 to 3,000 and a water tolerance value of not less than 2.0. The polyether polyol preferably has at least one primary hydroxyl group per molecule and a hydroxyl value of 30 to 700. More preferably, it has at least 3 hydroxyl groups per molecule. The composition preferably comprises a polyester resin and/or an alkyd resin.

The present invention also provides a method of forming a multilayer coating film comprising: applying a water-borne base coating to an article to be coated and then applying a clear coating thereonto, followed by curing by heating, wherein said water-borne base coating is the above-mentioned water-borne coating composition.

The water-borne base coating preferably has an application viscosity (viscosity in the step of application) at 25° C. of 500 to 5,000 mPa·s as determined on a single cylindrical rotational viscometer at 6 rpm.

The present invention also provides a multilayer coating film obtainable by the method mentioned above.

DETAILED DESCRIPTION OF THE INVENTION

Water-borne Coating Composition

The water-borne coating composition of the invention comprises a water-borne coating composition according to the first aspect of the present invention and a water-borne coating composition according to the second aspect of the invention.

The water-borne coating composition according to the first aspect of the invention comprises an emulsion resin obtained by emulsion polymerization of an $\alpha,\beta$-ethylenically unsaturated monomer mixture containing not less than 65% by weight of a (meth)acrylate ester whose ester-forming moiety contains 1 or 2 carbon atoms and having an acid value of 3 to 50, and a urethane compound represented by the above general formula (1) or (2) and is characterized in that the content of the urethane compound is 0.01 to 20% by weight based on the resin solids in the coating composition.

The emulsion resin to be contained in the water-borne coating composition according to the first aspect of the present invention is obtained by emulsion polymerization of an $\alpha,\beta$-ethylenically unsaturated monomer mixture containing not less than 65% by weight of a (meth)acrylate ester whose ester-forming moiety contains 1 or 2 carbon atoms and having an acid value of 3 to 50.

If the amount of the (meth)acrylate ester whose ester-forming moiety contains 1 or 2 carbon atoms is less than 65% by weight in the $\alpha,\beta$-ethylenically unsaturated monomer mixture, the appearance of the resulting multilayer coating film will be deteriorated. The (meth)acrylate ester whose ester-forming moiety contains 1 or 2 carbon atoms specifically includes methyl (meth)acrylate and ethyl (meth)acrylate. The "(meth)acrylate ester" includes, within the meaning thereof, both of acrylate and methacrylate esters.

The above $\alpha,\beta$-ethylenically unsaturated monomer mixture has an acid value of 3 to 50, preferably 7 to 40. If the acid value is less than 3, the workability in the step of application will be unsatisfactory and, if it exceeds 50, various performance characteristics of the resulting coating film will become deteriorated.

Such $\alpha,\beta$-ethylenically unsaturated monomer mixture contains an acid group-containing $\alpha,\beta$-ethylenically unsaturated monomer. As specific examples of the acid group-containing $\alpha,\beta$-ethylenically unsaturated monomer, there may be mentioned acrylic acid, methacrylic acid, acrylic acid dimer, crotonic acid, 2-acryloyloxyethyl phthalate, 2-acryloyloxyethyl succinate, 2-acryloyloxyethyl acid phosphate, 2-acrylamido-2-methylpropanesulfonic acid, $\omega$-carboxy-polycaprolactone mono(meth)acrylate, isocrotonic acid, $\alpha$-hydro-$\omega$-[(1-oxo-2-propenyl)oxy]poly[oxy(1-oxo-1,6-hexane-diyl)], maleic acid, fumaric acid, itaconic acid, 3-vinylsalicylic acid, 3-vinylacetylsalicyclic acid and like monomers having an acid group such as a carboxyl group, a sulfonic acid group or a phosphoric acid group.

The $\alpha,\beta$-ethylenically unsaturated monomer having an acid group may be the above-mentioned (meth)acrylate ester whose ester-forming moiety contains 1 or 2 carbon atoms. Preferred among them are acrylic acid, methacrylic acid and acrylic acid dimer.

The above $\alpha,\beta$-ethylenically unsaturated monomer mixture may have a hydroxyl group. The above hydroxyl value thereof is 10 to 150, preferably 20 to 100. If the hydroxyl value is less than 10, no sufficient curability will be obtained and, if it exceeds 150, various characteristics of the resulting coating film will be deteriorated. Such $\alpha,\beta$-ethylenically unsaturated monomer mixture contains a hydroxyl group-containing $\alpha,\beta$-ethylenically unsaturated monomer. The above hydroxyl group-containing $\alpha,\beta$-ethylenically unsaturated monomer includes hydroxyethyl(meth)acrylate, hydroxypropyl(meth)acrylate, hydroxybutyl(meth)acrylate, allyl alcohol, methacryl alcohol and hydroxyethyl (meth)acrylate-$\epsilon$-caprolactone adducts. Such hydroxyl group-containing $\alpha,\beta$-ethylenically unsaturated monomer may be the above-mentioned (meth)acrylate ester whose ester-forming moiety contains 1 or 2 carbon atoms. Preferred among them are hydroxyethyl(meth)acrylate, hydroxybutyl (meth)acrylate and hydroxyethyl(meth)acrylate-$\epsilon$-caprolactone adducts. The water-borne coating composition containing the emulsion resin obtained from such an $\alpha,\beta$-ethylenically unsaturated monomer mixture, when supplemented with a curing agent, which is to be mentioned later herein, can show a high level of curability.

The $\alpha,\beta$-ethylenically unsaturated monomer mixture may further contain another $\alpha,\beta$-ethylenically unsaturated monomer selected from among, for example, (meth)acrylate esters whose ester-forming moiety contains 3 or more carbon atoms (e.g. n-butyl(meth)acrylate, isobutyl(meth)acrylate, tert-butyl(meth)acrylate, 2-ethylhexyl(meth)acrylate, lauryl (meth)acrylate, phenyl(meth)acrylate, isobornyl(meth)acrylate, cyclohexyl(meth)acrylate, tert-butylcyclohexyl (meth)acrylate, dicyclopentadienyl(meth)acrylate, dihydrodicyclopentadienyl(meth)acrylate, etc.), polymerizable amide compounds (e.g. (meth)acrylamide, N-methylol (meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth)acrylamide, 2,4-dihydroxy-4'-vinylbenzophenone, N-(2-hydroxyethyl)acrylamide, N-(2-hydroxyethyl) methacrylamide, etc.), polymerizable aromatic compounds (e.g. styrene, $\alpha$-methylstyrene, vinyl ketone, tert-butylstyrene, parachlorostyrene, vinylnaphthalene, etc.), polymerizable nitriles (e.g. acrylonitrile, methacrylonitrile, etc.), $\alpha$-olefins (e.g. ethylene, propylene, etc.), vinyl esters (e.g. vinyl acetate, vinyl propionate, etc.), and dienes (e.g. butadiene, isoprene, etc.).

An appropriate one can be selected from among those mentioned above according to the purpose. For providing hydrophilicity easily, (meth)acrylamide is preferably used.

The content, in the above $\alpha,\beta$-ethylenically unsaturated monomer mixture, of the $\alpha,\beta$-ethylenically unsaturated monomer(s) other than the (meth)acrylate ester whose ester-forming moiety contains 1 or 2 carbon atoms should be less than 35% by weight.

The glass transition temperature (Tg) of the above emulsion resin is preferably within the range of −20 to 80° C. from the viewpoint of physical properties of the resulting coating film.

The above-mentioned acid value, hydroxyl value and Tg may be determined by actual measurements of the above emulsion resin therefor. It is also possible to calculate them based on the contents of the respective $\alpha,\beta$-ethylenically unsaturated monomers in the above $\alpha,\beta$-ethylenically unsaturated monomer mixture.

The emulsion resin to be contained in the water-borne coating composition according to the first aspect of the present invention is obtained by emulsion polymerization of the above-mentioned $\alpha,\beta$-ethylenically unsaturated monomer mixture. Here, the emulsion polymerization can be carried out by any of the methods well known generally. Specifically, it can be carried out by dissolving an emulsifier in water or an aqueous medium containing an organic solvent such as an alcohol according to need and adding the above $\alpha,\beta$-ethylenically unsaturated monomer mixture and a polymerization initiator dropwise with heating and stirring. The α,β-ethylenically unsaturated monomer mixture emulsified in advance using an emulsifier and water may also be added dropwise in the same manner.

The above polymerization initiator is preferably selected from among oil-soluble azo compounds (e.g. azobisisobutyronitrile, 2,2'-azobis(2-methylbutyronitrile), 2,2'-azobis(2,4-dimethylvaleronitrile), etc.) and water-soluble compounds (e.g. anionic 4,4'-azobis(4-cyanovaleric acid) and cationic 2,2'-azobis(2-methylpropionamidine)); as well as oil-soluble peroxides (e.g. benzoyl peroxide, parachlorobenzoyl peroxide, lauroyl peroxide, tert-butyl perbenzoate, etc.) and water-soluble peroxides (e.g. potassium persulfate, ammonium peroxide, etc.) in redox systems.

The emulsifier mentioned above includes those commonly used by those skilled in the art. Reactive emulsifiers are particularly preferred, however, for example Antox MS-60 (product of Nippon Nyukazai), Eleminol JS-2 (product of Sanyo Chemical Industries), Adeka Reasoap NE-20 (product of Asahi Denka Kogyo) and Aqualon HS-10 (product of Dai-ichi Kogyo Seiyaku).

For molecular weight adjustment, a chain transfer agent such as a mercaptan (e.g. lauryl mercaptan) or α-methylstyrene dimer may be used according to need.

The reaction temperature depends on the polymerization initiator. With an azo initiator, for example, the polymerization is preferably carried out at 60 to 90° C. and, in a redox system, at 30 to 70° C. Generally, the reaction time is 1 to 8 hours. The polymerization initiator is used generally in an amount of 0.1 to 5% by weight, preferably 0.2 to 2% by weight, based on the total amount of the α,β-ethylenically unsaturated monomer mixture.

The above emulsion polymerization can be carried out in two stages. Namely, a portion of the α,β-ethylenically unsaturated monomer (such portion hereinafter referred to as α,β-ethylenically unsaturated monomer mixture 1) is first subjected to emulsion polymerization and then the remaining portion of the α,β-ethylenically unsaturated monomer mixture (such portion hereinafter referred to as α,β-ethylenically unsaturated monomer mixture 2) is further added thereto to carry out emulsion polymerization. The above α,β-ethylenically unsaturated monomer mixture 1 and α,β-ethylenically unsaturated monomer mixture 2 may be the same or different in their composition.

For forming multilayer coating film with high-quality appearance, the α,β-ethylenically unsaturated monomer mixture 1 preferably contains an amide group-containing α,β-ethylenically unsaturated monomer and, in this case, the α,β-ethylenically unsaturated monomer mixture 2 is more preferably free of any amide group-containing α,β-ethylenically unsaturated monomer. Since the α,β-ethylenically unsaturated monomer mixture 1 and α,β-ethylenically unsaturated monomer mixture 2 combinedly constitute the above-mentioned α,β-ethylenically unsaturated monomer mixture, the conditions imposed on the α,β-ethylenically unsaturated monomer mixture as shown above is satisfied by the mixture of the α,β-ethylenically unsaturated monomer mixture 1 and α,β-ethylenically unsaturated monomer mixture 2.

The thus-obtained emulsion resin preferably has a mean particle diameter within the range of 0.01 to 1.0 μm. If the mean particle diameter is less than 0.01 μm, the improvement of workability in the step of application will be slight and, if it exceeds 1.0 μm, the appearance of the resulting coating film may possibly be deteriorated. This mean particle diameter can be adjusted by controlling the monomer composition and/or emulsion polymerization conditions, for instance.

The above emulsion resin can be used at a pH of 5 to 10, when necessary after neutralization with abase. This is because the stability of the resin is high in this pH range. The neutralization is preferably effected by adding a tertiary amine, such as dimethylethanolamine and triethylamine, to the system before or after emulsion polymerization. The content of the above emulsion resin in the resin solid of the water-borne coating composition is preferably 5 to 95% by weight, more preferably 10 to 85% by weight, still more preferably 20 to 70% by weight. If the content in question is outside the above range, the workability in the step of application and/or the appearance of the resulting coating film may possibly be deteriorated.

The urethane compound to be contained in the water-borne coating composition according to the first aspect of the present invention is represented by the general formula (1) or (2):

in formulas, $R^1$, $R^2$, $R^3$, $R^4$ and $R^5$ may be the same of different and each represents a hydrocarbon group, $R^1$ represents a hydrocarbon group which may optionally have a urethane bond, $R^3$ represents a branched or secondary hydrocarbon group, n is a number not less than 2, j is a number not less than 1 in the general formula (1) or a number not less than 2 in the general formula (2) and k and m each is a number within the range of 1 to 500.

The urethane compound represented by the above general formula (1) can be obtained, for example, by reacting one or two or more mono- or poly-isocyanates represented by $R^1$—$(NCO)_j$ with one or two or more polyether monoalcohols represented by HO—$(R^2$—$O)_k$—$R^3$, as raw materials. In this case, $R^1$ to $R^3$ in the above formulas correspond to those groups respectively contained in $R^1$—$(NCO)^j$ and HO—$(R^2$—$O)_k$—$R^3$.

The mono- or poly-isocyanate represented by the above $R^1$—$(NCO)_j$ is not particularly restricted but may be any one having one or more isocyanato groups per molecule. Thus, there may be mentioned, for example, aliphatic monoisocyanates such as methyl isocyanate, ethyl isocyanate, butyl isocyanate, propyl isocyanate, hexyl isocyanate, octyl isocyanate, lauryl isocyanate and octadecyl isocyanate; aromatic monoisocyanates such as phenyl isocyanate and tolylene isocyanate; alicyclic monoisocyanates such as cyclohexyl isocyanate; as well as aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentanediisocyanate, 3-methoxyhexanediisocyanate, octamethylene diisocyanate, 2,2,4-trimethylpentanediisocyanate, nonamethylene diisocyanate, decamethylene diisocyanate, 3-butoxyhexanediisocyanate, 1,4-butylene glycol dipropyl ether diisocyanate, thiodihexyl diisocyanate, metaxylylene diisocyanate, paraxylylene diisocyanate and tetramethylxylylene diisocyanate; aromatic diisocyanates such as metaphenylene diisocyanate, paraphenylene diisocyanate, 2,4-tolylene diisocyanate, 2,6-tolylene diisocyanate, dimethylbenzenediisocyanate, ethylbenzenediisocyanate, isopropylbenzenediisocyanate, tolidine diisocyanate, 1,4-naphthalenediisocyanate, 1,5-naphthalenediisocyanate, 2,6-naphthalenediisocyanate and 2,7-naphthalenediisocyanate; alicyclic diisocyanates such as hydrogenated xylylene diisocyanate and isophoronediisocyanate; biphenyl diisocyanates such as 3,3'-dimethylbiphenyldiisocyanate and 3,3'-dimethoxybiphenyldiisocyanate; phenylmethane-based diisocyanates such as diphenylmethane-4,4'-diisocyanate, 2,2'-dimethyldiphenylmethane-4,4'-diisocyante, diphenyldimethylmethane-4,4'-diisocyanate, 2,5,2',5'-tetramethyldiphenylmethane-4,4'-diisocyanate, cyclohexyl-bis(4-isocyanatophenyl)methane, 3,3'-dimethoxydiphenyl-methane-4,4'-diisocyanate, 4,4'-dimethoxydiphenylmethane-3,3'-diisocyanate, 4,4'-diethoxydiphenylmethane-3,3'-diisocyanate, 2,2'-dimethyl-5,5'-dimethoxydiphenyl-methane-4,4'-diisocyanate, 3,3'-dichlorodiphenyldimethyl-methane-4,4'-diisocyanate and benzophenone-3,3'-diisocyanate; triisocyanates such as 1-methylbenzene-2,4,6-triisocyanate, 1,3,5-trimethylbenzene-2,4,6-triisocyanate, 1,3,7-naphthalenetriisocyanate, biphenyl-2,4,4'-triisocyanate, diphenylmethane-2,4,4'-triisocyanate, 3-methyldiphenylmethane-4,6,4'-triisocyanate, triphenylmethane-4,4',4''-triisocyanate, 1,6,11-undecanetriisocyanate, 1,8-diisocyanato-4-isocyanato-methyloctane, 1,3,6-hexamethylene triisocyanate, bicycloheptanetriisocyanate, tris(isocyanatophenyl) thiophosphate; and tetraisocyanates and so forth.

The polyether monoalcohol represented by the above formula HO—$(R^2$—$O)_k$—$R^3$ is not particularly restricted but may be any branched or secondary monohydric alcohol-based polyether. Such compound can be obtained by addition polymerization of an alkylene oxide, styrene oxide or the like onto a branched or secondary monohydric alcohol. The branched or secondary monohydric alcohol so referred to herein is represented by the general formula (4) or (5):

in formulas, $R^6$ to $R^{10}$ each is a hydrocarbon group, for example an alkyl, alkenyl, alkylaryl, cycloalkyl, cycloalkenyl group or the like. Thus, $R^2$ is a group derived from the above general formula (4) or (5) by excepting for the hydroxyl group therefrom. From the viewpoint of the water resistance of the resulting coating film, $R^3$ is preferably an alkyl group and the total number of carbon atoms is preferably 8 to 36, more preferably 12 to 24.

The alkylene oxide, styrene oxide and the like to be added may be used singly for homopolymerization or in combination for random or block polymerization. The polymerization degree k is preferably 1 to 500, more preferably 10 to 200, from the viewpoint of the appearance of the resulting coating film. The proportion of the ethylenic group in $R^2$ is preferably 50 to 100% by weight, more preferably 65 to 100% by weight, from the viewpoint of the appearance of the resulting coating film.

As a method of obtaining the above-mentioned urethane compound represented by the above general formula (1), there may be mentioned, for example, the method comprising mixing a mono- or poly-isocyanate represented by $R^1$—$(NCO)_j$ with a polyether monoalcohol represented by HO—$(R^2$—$O)_k$—$R^3$ in respective amounts such that the ratio between the hydroxyl value and isocyanato value of the respective compounds to 1.05/1 to 1.4/1, and carrying out the reaction in the same manner as in the ordinary reaction between a polyether and an isocyanate, for example by heating at 80 to 90° C. for 1 to 3 hours.

The urethane compound represented by the above general formula (2) can be obtained, for example, by reacting a polyisocyanate which is selected from among mono- or polyisocyanates represented by $R^1$—$(NCO)_j$, namely raw materials to obtain the compounds of the above general formula (1), and in which j is 2 or more with a polyether monoalcohol represented by HO—$(R^2$—$O)_k$—$R^3$ and further with one or two or more polyether polyols represented by $R^4$-$[(O$—$R^5)_m$—$OH]_n$. In this case, $R^1$ to $R^5$ in the formulas correspond to those groups respectively contained in $R^4$—$[(O$—$R^5)_m$—$OH]_n$, $R^1$—$(NCO)_j$ and HO—$(R^2$—$O)_k$—$R^3$.

Among the mono- or polyisocyanates represented by the above formula $R^1$—$(NCO)_j$, the polyisocyanates in which j is 2 or more have two or more isocyanato groups per molecule and specifically include those polyisocyanates represented by $R^1$—$(NCO)_j$ (in which j is 2 or more) as mentioned hereinabove referring to the general formula (1).

The polyether monoalcohol represented by the above formula HO—$(R^2$—$O)_k$—$R^3$ is not particularly restricted but may be any branched or secondary monohydric alcohol-based polyether and thus specifically includes those mentioned hereinabove referring to the above general formula (1).

As the polyether polyol represented by above $R^4$—$[(O$—$R^5)_m$—$OH]_n$, there may be mentioned those mentioned later herein as polyether polyols. While $R^5$ corresponds to the alkylene oxide, styrene oxide or the like used for addition, alkylene oxides containing 2 to 4 carbon atoms and styrene oxide are preferred in view of easy commercial availability. The alkylene oxides, styrene oxide and the like may be added in the manner of homopolymerization, or in combination for polymerization or block polymerization. The degree of polymerization, m, is preferably 1 to 500, more preferably 1 to 200, still more preferably 10 to 200. The proportion of the ethylene group in $R^5$ is preferably 50 to 100% by weight, more preferably 65 to 100% by weight, of the total $R^5$ from the viewpoint of the appearance of the resulting coating film. Such polyether polyol preferably has a molecular weight of 500 to 50,000, more preferably 1,000 to 20,000.

As a method of obtaining the urethane compound represented by the above general formula (2), there may be mentioned, for example, the method comprising mixing one or two or more polyisocyanates represented by the above $R^1$—$(NCO)_j$ with one or two or more polyether monoalcohols represented by HO—$(R^2$—$O)_k$—$R^3$ and one or two or more polyether polyols represented by $R^4$—$[(O$—$R^5)_m$—$OH]_n$ in respective amounts such that the ratio between the hydroxyl value and isocyanato value of the respective compounds amounts to 1.05/1 to 1.4/1, and carrying out the reaction in the same manner as in the ordinary reaction of a polyether and isocyanate, for example by heating at 80 to 90° C. for 1 to 3 hours.

The content of the urethane compound represented by the above general formula (1) or (2) based on the resin solid matter in the water-borne coating is 0.01 to 20% by weight, preferably 0.1 to 10% by weight. If the above content is less than 0.01% by weight, the appearance of the resulting coating film will be improved only to an unsatisfactory extent or, when the water-borne coating contains a luster color pigment as a color component, which is to be mentioned later herein, the flip-flop property of the resulting coating film will be improved only to an unsatisfactory extent. If it exceeds 20% by weight, the various performance characteristics of the resulting coating film will possibly be deteriorated.

The water-borne coating composition according to the second aspect of the present invention comprises an water-borne resin prepared by dissolution or dispersion of a resin having an acid value of 10 to 100, a hydroxyl value of 30 to 200 and a weight average molecular weight of 4,000 to 2,000,000 in an aqueous medium by means of a neutralizing base and a urethane compound represented by the above general formula (1) or (2) and is characterized in that the content of the urethane compound is 0.01 to 20% by weight on the solid basis based on the resin solids in the coating composition.

The urethane compound to be contained in the water-borne coating composition according to the second aspect of the invention specifically includes the same ones as mentioned hereinabove referring to the water-borne coating composition according to the first aspect of the invention.

The water-borne resin to be contained in the water-borne coating composition according to the second aspect of the invention is prepared by dissolving or dispersing the above-mentioned resin having an acid value of 10 to 100, a hydroxyl value of 30 to 200 and a weight average molecular weight of 4,000 to 2,000,000 by means of a neutralizing base.

If the above-mentioned acid value is less than 10, the storage stability will decrease. If it is above 100, the water resistance of the resulting coating film will decrease. If the above hydroxyl value is less than 30, the curability and storage stability will decrease and, if it exceeds 200, the water resistance of the resulting coating film will decrease. Furthermore, if the weight average molecular weight is less than 4,000, the performance and physical characteristics of the resulting coating film will decrease and, if it exceeds 2,000,000, the smoothness of the resulting coating film will decrease and/or the handling of the resin will become difficult. The above weight average molecular weight can be determined by GPC.

Such resin is not particularly restricted but includes acrylic resins, polyester resins, alkyd resins, urethane resins, epoxy resins, and modifications of these, among others. In view of the performance and physical characteristics of the resulting coating film, acrylic resins, polyester resins and alkyd resins are preferred. The above acrylic resins are not particularly restricted but may be obtained, for example, by using a carboxyl group-containing ethylenically unsaturated monomer, such as (meth)acrylic acid, and a hydroxyl group-containing ethylenically unsaturated monomer, such as hydroxyethyl (meth)acrylate, if necessary together with another ethylenically unsaturated monomer, such as methyl (meth)acrylate and styrene, as raw materials and polymerizing them by a conventional method well known by those skilled in the art.

The above polyester resins are not particularly restricted but may be obtained, for example, by using a polybasic carboxylic acid component, such as adipic acid and maleic anhydride, and a polyhydric alcohol, such as 1,6-hexanediol and neopentyl glycol, if necessary together with a monocarboxylic acid, such as benzoic acid and tert-butylbenzoic acid, a hydroxy carboxylic acid, such as hydroxybenzoic acid and hydroxypivalic acid, a monoepoxide compound, such as Cardura E (product of Shell Chemical) and/or a lactone, such as ε-caprolactone and δ-valerolactone, as raw materials and carrying out the polycondensation by a conventional method well known by those skilled in the art.

Further, the alkyd resins can be obtained by using raw materials of the above polyester resin and a fat or oil component such as coconut oil and palm kernel oil as raw materials and subjecting them to polycondensation.

The above neutralizing base includes inorganic bases, such as alkali metal hydroxides and ammonia, and amines such as methylamine, dimethylamine, trimethylamine, ethylamine, diethylamine, triethylamine, isopropylamine, diisopropylamine, diethylenetriamine, triethylenetetramine, monoethanolamine, diethanolamine, 2-amino-2-methylpropanol, morpholine, N-methylmorpholine, N-ethylmorpholine, piperazine, dimethylethanolamine, diethylethanolamine and dimethyldodecylamine. Preferred are triethylamine, dimethylethanolamine and diethylethanolamine.

The above water-borne resin can be obtained by dissolving or dispersing the above resin in an aqueous medium containing the above neutralizing base in an amount of 0.3 to 1.2 equivalents, preferably 0.5 to 1.0 equivalent, based on the acid value of the resin.

The content of the above water-borne resin in the resin solid of the water-borne coating composition is preferably 5 to 95% by weight, more preferably 10 to 85% by weight, still more preferably 20 to 70% by weight. In cases where the above content is outside the above range, the workability in the step of the application and/or the appearance of the resulting coating film may possibly be deteriorated.

The water-borne coating compositions according to the first and second aspects of the invention may further contain a polyether polyol. Such polyether polyol preferably has not less than 0.02 (on average), more preferably not less than 0.04 (on average), still more preferably not less than 1 (on average), primary hydroxyl group per molecule. If the number of primary hydroxyl groups is less than 0.02, the various performance characteristics of the resulting coating film will decrease. The polyether polyol mentioned above may have a secondary and/or tertiary hydroxyl group or groups in addition to the primary hydroxyl group(s) and, from the viewpoint of the performance characteristics of the resulting coating film, the total number of hydroxyl groups per molecule is preferably not less than 3. The above polyether polyol preferably has a hydroxyl value of 30 to 700, more preferably 50 to 500. If the hydroxyl value is outside the above range, the storage stability of the coating may lower or the various performance characteristics of the resulting coating film may possibly be deteriorated.

The above polyether polyol preferably has a number average molecular weight of 300 to 3,000, more preferably 400 to 2,000. If the number average molecular weight is outside the above range, for example less than 300, the performance characteristics of the resulting coating film will deteriorate. The number average molecular weight can be determined by GPC (gel permeation chromatography) using polystyrene species as standards.

Further, the above polyether polyol has a water tolerance value of not less than 2.0, preferably not less than 3.0. If the water tolerance value is less than 2.0, the stability of the coating will lower and the appearance of the resulting coating film will be deteriorated. The water tolerance value is used for evaluating the degree of hydrophilicity and a higher value means a higher level of hydrophilicity. The above water tolerance value is determined by mixing 0.5 g of said polyether polyol with 10 ml of acetone in a 100-ml beaker at 25° C. and, after dispersion, adding deionized water gradually to this mixture using a burette. The amount (ml) of deionized water as required for the mixture to become turbid is measured. This amount (ml) of deionized water is referred to as water tolerance value.

According to this method, when the polyether polyol is hydrophobic, for instance, the good compatibility state initially found between the polyether polyol and acetone is changed into an incompatibility state upon addition of a small amount of deionized water and the mixture becomes turbid. On the contrary, with hydrophilic polyether polyols, a larger amount of deionized water is required for each mixture to become turbid with the increasing hydrophilicity of the polyether polyol. Therefore, the degree of hydrophilicity/hydrophobicity of a polyether polyol can be measured by this method.

In cases where the water-borne coating composition according to the first or second aspect of the invention contains the above polyether polyol, the content thereof is preferably 1 to 40% by weight, more preferably 3 to 30% by weight, in the resin solid of the coating. If the above content is less than 1% by weight, the appearance of the resulting coating film will be deteriorated and, if it exceeds 40% by weight, the various performance characteristics of the resulting coating film may possibly be deteriorated.

As such polyether polyol, there may specifically be mentioned compounds derived from active hydrogen atom-containing compounds by addition of an alkylene oxide. The above active hydrogen atom-containing compounds include polyhydric alcohols, polyhydric phenols, polybasic carboxylic acids and the like. Thus, mention may be made, for example, of water; those polyhydric alcohol components mentioned hereinabove referring to the water-borne resin in the water-borne coating composition according to the second aspect of the invention as well as tetrahydric alcohols such as diglycerol and sorbitan; pentahydric alcohols such as adonitol, arabitol, xylitol and triglycerol; hexahydric alcohols such as dipentaerythritol, sorbitol, mannitol, iditol, inositol, dulcitol, talose and allose; octahydric alcohols such as sucrose; polyhydric alcohols such as polyglycerol, polyhydric phenols such as pyrogallol, hydroquinone and phloroglucinol, bisphenols such as bisphenol A and bisphenol sulfone and like polyhydric phenols; those polybasic carboxylic acid components mentioned hereinabove referring to the water-borne resin in the water-borne coating composition according to the second aspect of the invention, and mixtures of two or more of these.

In particular, preferred as the at least trihydric alcohol to be used for forming polyether polyols having a total of three or more hydroxyl groups per molecule are glycerol, trimethylolethane, trimethylolpropane, pentaerythritol, sorbitan, sorbitol and the like.

The above alkylene oxide specifically includes ethylene oxide, propylene oxide, butylene oxide and like alkylene oxides, and two or more of these may be used in combination. When two or more of them are used, the mode of addition may be blockwise or random.

As such polyether polyols that are commercially available, there may be mentioned, for example, Primepol PX-1000, Sannix SP-750, PP-400 (all being products of Sanyo Chemical Industries) and PTMG-650 (product of Mitsubishi Chemical).

The above polyether polyols can be obtained by subjecting the above-mentioned active hydrogen-containing compound and above alkylene oxide to addition reaction in the conventional manner at ordinary pressure or under pressure at a temperature of 60 to 160° C., generally in the presence of an alkali catalyst.

The above polyether polyols can be modified for improving the pigment dispersing ability thereof by, as described in Japanese Kokai Publication Sho-59-138269, using, as a modifier, a basic substance such as an amino resin to be mentioned later herein, hydroxyethylethylenimine (e.g. Sogo Pharmaceutical's "HEA") or 2-hydroxypropyl 2-aziridinylethylcarboxylate (e.g. Sogo Pharmaceutical's "HPAC"). The above modifier is used preferably in an amount of 1 to 10% by weight relative to the polyether polyol. If the modifier amount is less than 1% by weight, no satisfactory modifying effect will be produced and, if it exceeds 10% by weight, the stability of the modified polyether polyol may possibly decreased.

The water-borne coating compositions according to the first and second aspect of the invention may contain a color component in addition to the above components so that the resulting coating film may be provided with a beautiful appearance and decorativeness. Such color component includes color pigments and luster color pigments. The color pigments include, for example, organic ones such as azo chelate pigments, insoluble azo pigments, condensed azo pigments, phthalocyanine pigments, indigo pigments, perinone pigments, perylene pigments, dioxane pigments, quinacridone pigments, isoindolinone pigments, metal chelate pigments and the like, and inorganic ones such as chrome yellow, yellow iron oxide, red iron oxide, carbon black and titanium dioxide. The luster color pigments are not particularly restricted in shape. They maybe colored. Preferred are, however, flake-like ones having a mean particle diameter (D50) of 2 to 50 $\mu$m and a thickness of 0.1 to 5 $\mu$m, for instance. Those having a mean particle size within the range of 10 to 35 $\mu$m are excellent in spangling effect, hence are more preferred. Specific examples are uncolored or colored metal- or alloy-based luster color pigments derived from aluminum, copper, zinc, iron, nickel, tin, alumina and so forth, as well as mixtures thereof. The luster color pigments also include interfering mica pigments, white mica pigments, graphite pigments and the like.

The concentration of the color component in the solid contained in the above water-borne coating composition according to the first or second aspect of the invention is preferably 0.1 to 50% by weight, more preferably 0.5 to 40% by weight, still more preferably 1.0 to 30% by weight. If the above concentration is less than 0.1% by weight, no satisfactory coloring effect can be obtained and, if it exceeds 50% by weight, the appearance of the resulting coating film maybe deteriorated. In cases where a luster color pigment is contained as the color component, the concentration of the color component is generally not more than 18.0% by weight, preferably 0.01 to 15.0% by weight, more preferably 0.01 to 13.0% by weight.

Preferably, the water-borne coating compositions according to the first and second aspects of the invention contain a polyester resin and/or an alkyd resin. Particularly, in cases where the water-borne coating composition according to the first or second aspect of the invention contains a flake-like luster color pigment, the flip-flop property of the resulting coating film can be improved. As such polyester resin and alkyd resin, there may be mentioned those have a number average molecular weight of 3,000 to 50,000, more preferably 3,000 to 30,000. If it is outside the above range, the workability in the step of application and/or curability will be insufficient.

This polyester resin or alkyd resin preferably has an acid value of the solid of 10 to 100, more preferably 20 to 80. If the above acid value of the solid exceeds 100, the water resistance of the coating film will decrease and, if it is lower than 10, the water dispersibility or solubility of the resin will decrease. It also preferably has a hydroxyl value of 10 to 180, more preferably 20 to 160. If the hydroxyl value exceeds 180, the water resistance of the coating film will decrease and, if it is lower than 10, the curability of the coating film will decrease. As the method to obtain such polyester resin and alkyd resin, there may be mentioned, specifically, the method as mentioned hereinabove referring to the water-borne coating composition according to the second aspect of the invention.

In cases where the above polyester resin and/or alkyd resin are contained, based on the weight of the resin solid, the ratio of emulsion resin/polyester resin or alkyd resin in the water-borne coating composition according to the first aspect of the invention and the ratio of water-borne resin/polyester resin or alkyd resin in the water-borne coating composition according to the second aspect of the invention is preferably 5/95 to 95/5, more preferably 10/90 to 85/15, still more preferably 20/80 to 70/30. If it is outside the above range, the sagging prevention in the step of application and the appearance of the coating film will be deteriorated. In cases where the above polyester resin and alkyd resin satisfy the condition of the water-borne resin as mentioned hereinabove referring to the water-borne coating composition according to the second aspect of the invention, the above water-borne resin and the above polyester resin or alkyd resin may be the same. In cases where the above polyester resin and/or alkyd resin is incorporated, from the viewpoint of the storage stability, it is preferred to be incorporated after dissolving or dispersing into the aqueous medium by means of a neutralizing base, in advance.

In cases where the water-borne coating composition according to the first or second aspect of the invention contains a flake-like luster color pigment, it is preferable that the composition further contains a phosphoric acid group-containing acrylic resin. This phosphoric acid group-containing acrylic resin is obtained by copolymerizing a monomer represented by the general formula (3) given below and another ethylenic monomer.

$$CH_2=CXCO(OY)_h\text{—}OPO(OH)_2 \quad (3)$$

In the formula, X represents a hydrogen atom or a methyl group, Y represents an alkylene group containing 2 to 4 carbon atoms and h represents an integer of 3 to 30.

The above phosphoric acid group-containing acrylic resin is used for improving the dispersion of the above-mentioned flake-like luster color pigment. The above phosphoric acid group-containing acrylic resin preferably has a number average molecular weight of 1,000 to 50,000. If the number average molecular weight is less than 1,000, the flake-like luster color pigment cannot be dispersed satisfactorily in certain instances and, if the number average molecular weight exceeds 50,000, the appearance of the resulting coating film may possibly be deteriorated.

Further, the above phosphoric acid group-containing acrylic resin preferably has the acid value of the solid of 15 to 200. More preferably, the acid value due to the phosphoric acid group is 10 to 150. If the acid value is less than 15, the flake-like luster color pigment may not be dispersed satisfactorily and, if the acid value exceeds 200, the storage stability of the water-borne coating composition may decrease.

Furthermore, the above phosphoric acid group-containing acrylic resin may have a hydroxyl value to keep up the curability, and its value is preferably 20 to 200.

The above phosphoric acid group-containing acrylic resin is contained preferably in an amount of 0.01 to 5 parts by weight, more preferably 0.1 to 4 parts by weight, particularly preferably 0.2 to 3 parts by weight, per 100 parts by weight of the coating resin solid. If the content of the phosphoric acid group-containing acrylic resin is excessively low, the various performance characteristics of the coating film may deteriorate in some instances and, if the content of the phosphoric acid group-containing acrylic resin is excessively high, the storage stability of the coating will deteriorate.

As specific examples of the monomer represented by the above general formula (3), there maybe mentioned, for example, acid phosphoxyhexa(oxypropylene) monomethacrylate, acid phosphoxydodeca(oxypropylene) monomethacrylate and the like.

The above-mentioned other ethylenic monomer is an ethylenic monomer copolymerizable with the monomer represented by the above general formula (3) and may be a mixture of a plurality of monomer species. The other ethylenic monomer may contain a functional group other than phosphoric acid groups so as to cure the copolymer obtained, namely the acrylic resin, with a curing agent. Specifically, there may be mentioned monomers having a carboxyl or sulfonic acid group or a like acidic group or a hydroxyl group.

In cases where the water-borne coating composition according to the first or second aspect of the invention contains a metal-made luster color pigment as the color component, the composition to be used as a corrosion inhibitor for the luster color pigment or for improving the wettability of the luster color pigment and improving the physical properties of the resulting multilayer coating film preferably has an phosphoric acid group-containing compound having an alkyl group. The alkyl group preferably contains 8 to 18 carbon atoms, more preferably 10 to 14 carbon atoms. If the number of carbon atoms is less than 8, the wettability will decrease and the adhesiveness will also decrease. If it exceeds 18, the compound may possibly crystallize out in the coating, hence may cause troubles.

The above compound preferably has an HLB value of 3 to 12, more preferably 4 to 8. If the HLB value is outside the above range, the wettability may possibly decrease. The HLB value can be determined using Griffin's equation based on weight fractions, namely HLB=20×(MH/M) [where MH denotes the molecular weight of the hydrophilic moiety and M denotes the molecular weight of the active agent]. The molecular weight of the hydrophilic moiety can be determined using the molecular weight of the phosphate ester, sulfonic acid or carboxylic acid.

As such compound, there may specifically be mentioned 2-ethylhexyl acid phosphate, mono- or di-diisodecyl acid phosphate, mono- or di-tridecyl acid phosphate, mono- or di-lauryl acid phosphate, mono- or di-nonylphenyl acid phosphate and the like.

In cases where the water-borne coating composition according to the first or second aspect of the invention contains the above compound, the content of the above compound is preferably 0.1 to 5% by weight, more preferably 0.2 to 2% by weight, based on the coating resin solid. If that content is less than 0.1% by weight, the adhesiveness will decrease and, if it is above 5% by weight, the water resistance may possibly decrease.

The water-borne coating compositions according to the first and second aspect of the invention may further contain another coating film-forming resin, if necessary. Such resin is not particularly restricted but acrylic resins, polyester resins, alkyd resins, epoxy resins, urethane resins and like coating film-forming resins can be used.

The other coating film-forming resin preferably has a number average molecular weight of 3,000 to 50,000, more preferably 3,000 to 30,000. If the number average molecular weight is less than 3,000, the workability in the step of application and curability will be insufficient and, if it is above 50,000, the nonvolatile matter content in the step of application will become excessively low, hence the workability in the step of application may rather decrease.

The other coating film-forming resin preferably has acid groups, and the acid value of the resin solid is preferably 10 to 100, more preferably 20 to 80. If the above acid value is less than 10, the water dispersibility of the resin will decrease and, if it is above 100, various performance characteristics of the resulting coating film may possibly decrease. Further, preferably, the other coating film-forming resin has hydroxyl groups, and the hydroxyl value is preferably 10 to 180, more preferably 20 to 160. If the above hydroxyl value is less than 10, the curability of the resulting coating film will decrease and, if it exceeds 180, various performance characteristics of the resulting coating film may possibly decrease.

In cases where the water-borne coating composition according to the first or second aspect of the invention contains such other coating film-forming resin, the content thereof in the resin solid of the water-borne coating composition is preferably 95 to 5% by weight, more preferably 90 to 15% by weight, still more preferably 80 to 30% by weight.

The water-borne coating compositions according to the first and second aspects of the invention may contain a curing agent. The above curing agent may be any of those commonly used for the coating in general. Specifically, there may be mentioned amino resins, blocked isocyanates, epoxy compounds, aziridine compounds, carbodiimide compounds, oxazoline compounds and metal ions. In view of the various performance characteristics of the resulting coating film and the cost, amino resins and/or blocked isocyanates are preferred.

The amino resins as above curing agents are not particularly restricted. Thus, water-soluble melamine resins or water-insoluble melamine resins can be used. Further, from the viewpoint of the stability of water-borne coating compositions, those melamine resins which have a water tolerance value of not less than 3.0 are preferably used. The water tolerance value can be measured in the same manner as mentioned hereinabove referring to the polyether polyol.

The above-mentioned blocked isocyanates are obtainable by adding an active hydrogen-containing blocking agent to polyisocyanates such as trimethylene diisocyanate, hexamethylene diisocyanate, xylylene diisocyanate and isophoronediisocyanate. Upon heating, the blocking agent is released and the thus-generated isocyanato groups react with the functional groups in the resin components mentioned above to thereby effect curing.

In cases where the water-borne coating composition according to the first or second aspect of the invention contains such curing agent, the content thereof is preferably 20 to 100 parts by weight per 100 parts by weight of the resin solid in the water-borne coating composition from the curability viewpoint.

In the water-borne coating composition according to the first or second aspect of the invention, there may be incorporated an additive generally added to coatings in general, for example surface modifiers, thickeners, antioxidants, ultraviolet inhibitors, antifoaming agents and so forth. The amounts of addition thereof are well known by those skilled in the art.

The production method of the water-borne coating compositions according to the first and second aspect of the invention is not particularly restricted but any of the methods known by those skilled in the art can be used, for example the method comprising incorporating compounding additives such as pigments by means of a kneader or roll, or dispersing them using a sand grinder or a disper.

Method for Forming a Multilayer Coating Film

According to the method of forming a multilayer coating film according to the present invention, multilayer coating films are formed by applying the above-mentioned water-borne base coating to an article to be coated, if necessary having an electrolytically deposited coating film and intermediate coating film formed thereon, and then applying the above-mentioned clear coating thereonto, and effecting curing by heating, and said water-borne base coating is the above-mentioned water-borne coating composition comprising a color component.

The method of forming a multilayer coating film according to the present invention can be applied to various substrates, for example shaped metal products, plastics moldings, foamed products and the like. The method is preferably applied to shaped metal products capable of being coated by cationic electrodeposition, however. As the shaped metal products, there may be mentioned plates and shaped products made of iron, copper, aluminum, tin, zinc or the like or an alloy comprising such metals and, more specifically, bodies and parts of automobiles, trucks, motorcycles, buses and the like. These are preferably subjected in advance to chemical conversion treatment with a phosphate or chromate salt or the like.

The above shaped metal products treated for chemical conversion may have an electrolytically deposited coating film formed thereon. The electrodeposition coating to be used for such purpose may be a cationic type one or an anionic type one. From the corrosion inhibition viewpoint, however, cationic electrodeposition coatings are preferred.

As the above plastics moldings, there may mentioned plates and other moldings made of polypropylene resins, polycarbonate resins, urethane resins, polyester resins, polystyrene resins, ABS resins, vinyl chloride resins, polyamide resins and the like and, more specifically, there may be mentioned automotive parts such as spoilers, bumpers, mirror covers, grills, doorknobs and the like. Furthermore, these plastics moldings are preferably washed beforehand with trichloroethane vapor or a neutral detergent. They may further be provided with a primer coating for enabling electrostatic coating.

Where necessary, the above substrate may have an intermediate coating film formed thereon. An intermediate coating is used for forming the intermediate coating film. This intermediate coating comprises a coating film-forming resin(s), a curing agent, an organic or inorganic color component, an extender pigment, and so forth.

The above coating film-forming resin and curing agent are not particularly restricted but specifically include those coating film-forming resins and curing agents mentioned hereinabove referring to the water-borne base coating. They are used in combination. In view of various performance characteristics and cost of the resulting intermediate coating film, an acrylic resin and/or a polyester resin is used in combination with an amino resin and/or an isocyanate.

As the color component to be contained in the above intermediate coating, there may be mentioned those mentioned hereinabove referring to the water-borne base coating. Generally, the so-called color intermediate coatings, such as gray intermediate coatings whose color is mainly based on carbon black and titanium dioxide, set gray ones matching in hue with the top coat and ones in which various color components are combined. Flat pigments such as powdered aluminum or powdered mica may further be added to the above composition.

In these intermediate coatings, there maybe incorporated, in addition to the components mentioned above, one or more of those additives which are generally added to coatings, for example surface modifiers, antioxidants, antifoaming agents and so on.

The above clear coating to be used in the method of forming a multilayer coating film of the invention is not particularly restricted but may be any of those clear coatings which contain a coating film-forming resin(s), a curing agent and so forth. It may further contain a color component at levels at which the decorativeness of the substrate will not be impaired. Such clear coating may be in a solvent-borne, water-borne or powder form.

As examples of the above solvent-borne clear coating which are preferred from the viewpoint of transparency or acid etching resistance, among others, there may be mentioned combinations of an acrylic resin and/or a polyester resin and an amino resin and/or an isocyanate, and an acrylic resin and/or a polyester resin comprising a carboxylic acid/epoxy curing system, for instance.

As examples of the water-borne clear coating, there may be mentioned those containing a water-borne resin derived from one of the coating film-forming resins which can be contained in the solvent-borne clear coatings mentioned above by way of example by neutralization of a base. This neutralization can be carried out before or after polymerization by adding a tertiary amine such as dimethylethanolamine or triethylamine.

The powder-form clear coating can be obtained by using an ordinary powder coating such as a thermoplastic or thermosetting powder coating. Thermosetting powder coatings are preferred since they give coating films having good physical properties. As specific examples of the thermosetting powder coatings, there maybe mentioned epoxy-based, acrylic-based and polyester-based powder clear coatings, among others. Acrylic-based powder clear coatings capable of providing good weathering resistance are particularly preferred, however.

Furthermore, a viscosity modifier is preferably added to the above clear coating to keep up the workability in the step of application. The viscosity modifier may be any of those which generally show thixotropic properties. Usable as such are those mentioned hereinabove referring to the water-borne base coating. If necessary, the above coating may contain one or more of such additives as curing catalysts, surface modifiers and so forth.

In the method of forming a multilayer coating film according to the present invention, the base coating films formed on articles to be coated as formed by applying the water-borne base coating provide the articles to be coated with a beautiful appearance and decorativeness.

Here, the color component to be contained in the above-mentioned water-borne base coating is preferably a color pigment and/or luster color pigment in view of the appearance and decorativeness of the resulting coating film. The color pigment and luster color pigment as mentioned above include, for example, those as mentioned hereinabove referring to the above-mentioned water-borne coating composition.

The water-borne base coating preferably has an application viscosity (viscosity in the step of application) at 25° C. of 500 to 5,000 mPa·s as determined on a single cylindrical rotational viscometer at 6 rpm. If the above application viscosity is lower than 500 mPa·s, sagging may occur on the occasion of application under high humidity conditions. If it exceeds 5,000 mPa·s, the smoothness of the resulting coating films may deteriorate on the occasion of application under low humidity conditions. As such single cylindrical rotational viscometer, there may be mentioned, for example, a measuring apparatus named type B viscometer, such as Tokyo Keiki model BM viscometer.

As the method of applying the above-mentioned water-borne base coating to automotive bodies, there may be mentioned, from the film appearance improvement viewpoint, the multistage, preferably two-stage, coating method using the air spray electrostatic application technique and the method using the air spray electrostatic application technique in combination with a rotary atomizing electrostatic coater called metallic bell.

The film thickness of coating films in the step of application of the water-borne base coating in conducting the method of forming a multilayer coating film according to the invention may vary according to the intended use but, generally, a dry film thickness of 10 to 30 $\mu$m is preferred. If the dry film thickness is less than 10 $\mu$m, the substrate surface cannot be fully hidden but film breakage may occur. If it is in excess of 30 $\mu$m, the image sharpness may decrease or troubles such as unevenness or/and sagging may occur.

While, in the method of forming a multilayer coating film according to the invention, the base coating films obtained by application of the water-borne base coating may be baked and then the clear coating may be applied thereonto, it is also possible to apply the clear coating to the base coating films in an uncured state to form clear coating films and, by doing so, the step of baking base coating films can be omitted. Thus, this technique is preferred from the economical and environmental viewpoint. For obtaining coating films having a good appearance, the base coating films are desirably heated at 40 to 100° C. for 2 to 10 minutes prior to application of the clear coating.

In the method of forming a multilayer coating film according to the invention, the clear coating films provided after formation of the base coating films correct the unevenness, flickering and so forth due to the base coating films and smoothen and protect the surface of coating films and further provide a better appearance. As the method of applying the clear coating to the base coating films, there may specifically be mentioned the coating method using a rotary atomizing electrostatic coater called micro-micro bell or micro bell.

It is generally preferred that the dry film thickness of the clear coating films formed by applying the above clear coating be within the range of about 10 to 80 $\mu$m, more preferably about 20 to 60 $\mu$m. If the above dry film thickness is less than 10 $\mu$m, the unevenness of the substrate surface cannot be hidden and, if it exceeds 80 $\mu$m, such troubles as foaming and/or sagging may occur in the step of coating.

The thus-formed clear coating films are preferably baked together with the uncuredbase coating films, as mentioned above, namely by the so-called two-coat one-bake technique for forming coating films. From the viewpoint of the crosslink density and physical properties of multilayer coating films, the baking temperature is preferably selected within the range of 80 to 180° C., more preferably 120 to 160° C. The baking time is selected arbitrarily but depending on the baking temperature. It is judicious to select a baking temperature of 120 to 160° C. and a baking time of 10 to 30 minutes.

The multilayer coating films formed by the method of forming a multilayer coating film according to the invention generally have a film thickness of 30 to 300 μm, preferably 50 to 250 μm. If the film thickness is less than 30 μm, the strength of the films themselves will be low and, if it exceeds 300 μm, the thermal shock resistance and other physical characteristics of the films may decrease.

The water-borne coating composition of the invention, which contains a specific emulsion resin or water-soluble polyester resin together with a urethane compound having a specific structure, can provide coating films having high levels of film appearance and smoothness. The water-borne coating composition of the invention shows a very low level of viscosity hysteresis, hence can be handled with ease in industrial applications.

The method of forming a multilayer coating film according to the invention, which uses a water-borne base coating comprising a specific emulsion resin and a urethane compound of specific structure, can provide multilayer coating films high in film appearance and smoothness, with the interlayer blotting or layer inversion being inhibited, when a base coat and a clear coat are formed in that order.

Furthermore, when it contains a flake-like luster color pigment, the water-borne coating composition can increase the whiteness of coating films by its further containing a polyester resin and/or an alkyd resin. Thus, it can improve the flip-flop property of coating films.

EXAMPLES

The following examples illustrate the present invention in more detail. The following examples, however, are by no means limitative of the scope of the present invention. In the following, "part(S)" means "part(s) by weight".

Production Example 1

Production of Aqueous Dispersion Resin A-1

Adeka Reasoap NE-20 (product of Asahi Denka Kogyo; α-{1-[(allyloxy)methyl]-2-(nonylphenoxy)ethyl}-ω-hydroxy-oxyethylene; aqueous solution with a solid content of 80% by weight; 0.2 part) and 0.2 part of Aqualon HS-10 (product of Dai-ichi Kogyo Seiyaku; polyoxyethylene alkylpropenylphenyl ether sulfate ester) were added to a reaction vessel containing 194.1 parts of deionized water, and the contents were heated to 80° C. in a nitrogen stream with stirring. Then, as a first stage of α,β-ethylenically unsaturated monomer mixture, a monomer mixture composed of 18.5 parts of methyl acrylate, 31.7 parts of ethyl acrylate, 5.8 parts of 2-hydroxyethyl acrylate, 10.0 parts of styrene, 4.0 parts of acrylamide, 0.3 part of Adeka Reasoap NE-20, 0.2 part of Aqualon HS-10 and 70 parts of deionized water and an initiator solution composed of 0.2 part of ammonium persulfate and 7 parts of deionized water were added dropwise in parallel to the reaction vessel over 2 hours. Thereafter, maturation was effected at the same temperature for 1 hour. Further, as a second stage of α,β-ethylenically unsaturated monomer mixture, a monomer mixture composed of 24.5 parts of ethyl acrylate, 2.5 parts of 2-hydroxyethyl acrylate, 3.1 parts of methacrylic acid, 0.3 part of Aqualon HS-10 and 30 parts of deionized water and an initiator solution composed of 0.1 part of ammonium persulfate and 3 parts of deionized water were added dropwise in parallel to the reaction vessel over 0.5 hour. Thereafter, maturation was effected at the same temperature for 2 hours.

The reaction mixture was then cooled to 40° C. and filtered through a 400-mesh filter. Further, it was adjusted to pH 7 by adding a 10% (by weight) aqueous solution of dimethylaminoethanol to give an aqueous dispersion type resin A-1 with a mean particle size of 110 nm, a nonvolatile matter content of 24%, an acid value of the solid matter of 20, a hydroxyl value of 40 and a Tg of 0° C.

Production Example 2

Production of Aqueous Dispersion Resin

Deionized water (126.5 parts) was added to a reaction vessel and the contents were heated to 80° C. in a nitrogen stream with stirring. Then, a first stage α,β-ethylenically unsaturated monomer mixture composed of 47.7 parts of methyl acrylate, 21.7 parts of ethyl acrylate, 6.6 parts of 2-hydroxyethyl acrylate, 4.0 parts of acrylamide, 0.5 part of Adeka Reasoap NE-20, 0.5 part of Aqualon HS-10 and 80 parts of deionized water and an initiator solution composed of 0.2 part of ammonium persulfate and 10 parts of deionized water were added dropwise in parallel to the reaction vessel over 2 hours. Thereafter, maturation was effected at the same temperature for 1 hour.

Further, a second stage α,β-ethylenically unsaturated monomer mixture composed of 15.3 parts of ethyl acrylate, 1.7 parts of 2-hydroxyethyl acrylate, 3.1 parts of methacrylic acid, 0.2 part of Aqualon HS-10 and 10 parts of deionized water and an initiator solution composed of 0.1 part of ammonium persulfate and 10 parts of deionized water were added dropwise in parallel to the reaction vessel over 0.5 hour. Thereafter, maturation was effected at the same temperature for 2 hours.

The reaction mixture was then cooled to 40° C. and filtered through a 400-mesh filter. Further, it was adjusted to pH 7 by adding a 10% (by weight) aqueous solution of dimethylaminoethanol to give an aqueous dispersion type resin A-2 with a mean particle size of 150 nm, a nonvolatile matter content of 29%, a solid matter acid value of 20 and a hydroxyl value of 40.

Production Example 3

Production of Water-soluble Resin B-1

A reaction vessel was charged with 23.9 parts of dipropylene glycol methyl ether and 16.1 parts of propylene glycol methyl ether, and the contents were heated to 120° C. with stirring in a nitrogen stream. Then, a mixed solution composed of 54.5 parts of ethyl acrylate, 12.5 parts of methyl methacrylate, 14.7 parts of 2-hydroxyethyl acrylate, 10.0 parts of styrene and 8.5 parts of methacrylic acid and an initiator solution composed of 10.0 parts of dipropylene glycol methyl ether and 2.0 parts of tert-butyl peroxy-2-ethylhexanoate were added dropwise in parallel to the reaction vessel over 3 hours. Thereafter, maturation was effected at the same temperature for 0.5 hour.

Further, an initiator solution composed of 5.0 parts of dipropylene glycol methyl ether and 0.3 part of tert-butyl peroxy-2-ethylhexanoate was added dropwise to the reaction vessel over 0.5 hour. Thereafter, maturation was effected at the same temperature for 1 hour.

Then, using a solvent removing apparatus, 16.1 parts of the solvent was distilled off at 110° C. under reduced pressure (70 Torr), and 187.2 parts of deionized water and 8.8 parts of dimethylaminoethanol were added to give a water-soluble resin B-1 with a nonvolatile matter content of 31%, a weight average molecular weight of 27,000, a number average molecular weight of 9,000, a solid matter acid value of 56, a hydroxyl value of 70 and a viscosity of 15,000 mPa·s (measuring apparatus: Toki Sangyo model R

Production Example 4

Production of Water-soluble Resin B-2

A reaction vessel was charged with 200.0 parts of isophthalic acid, 179.0 parts of phthalic anhydride, 150.0 parts of trimethylolpropane, 295.0 parts of neopentyl glycol and 2 parts of dibutyltin oxide, and raw materials were heated in a nitrogen stream to be dissolved and then the temperature was gradually raised to 170° C. with stirring. Then, dehydration and transesterification were effected while raising the temperature to 220° C. over 3 hours. After attainment of an acid value of 10, the mixture was cooled to 150° C. Further, 110.0 parts of hexahydrophthalic acid was added and the reaction was allowed to proceed for 1 hour and then the reaction was completed. After further cooling to 100° C., 112.0 parts of butylcellosolve was added. A resin was thus obtained.

The resin obtained was cooled to 60° C., and 80.0 parts of dimethylethanolamine and deionized water were added to give a water-soluble resin B-2 with a nonvolatile matter content of 50%, an acid value of the solid matter of 50, a hydroxyl value of 65, a weight average molecular weight of 10,000 as determined by GPC(gel permeation chromatography), a number average molecular weight of 3,000 and a viscosity of 5,000 mPa·s (measuring apparatus: Toki Sangyo model R series 500, conical rotary viscometer; measurement conditions: 1.34-degree cone, 1 rpm/25° C.).

Production Example 5

Production of Phosphoric Acid Group-containing Acrylic Resin

Methoxypropanol (23 parts) was added to a reaction vessel and heated to 120° C. with stirring in a nitrogen stream. Then, a mixed solution prepared by admixing a solution (22 parts) of 15 parts of Phosmer PP (product of Unichemical; acid phosphoxyhexa(oxypropylene) monomethacrylate) in 7 parts of methoxypropanol with 12.3 parts of 2-ethylhexyl acrylate, 7.0 parts of 2-hydroxyethyl methacrylate, 7.5 parts of lauryl methacrylate, 4.4 parts of styrene and 3.8 parts of methacrylic acid and an initiator solution composed of 4.5 parts of methoxypropanol and 0.9 part of azobisisobutyronitrile were added dropwise in parallel to the reaction vessel over 3 hours. Thereafter, maturation was effected at the same temperature for 0.5 hour.

Further, an initiator solution composed of 0.5 part of methoxypropanol and 0.5 part of azobisisobutyronitrile was added dropwise to the reaction vessel over 0.5 hour. Thereafter, maturation was effected at the same temperature for 1.5 hours and then 13.7 parts of methoxypropanol was added to give a phosphoric acid group-containing acrylic resin with a nonvolatile matter content of 50%, an acid value of the solid matter of 61, a hydroxyl value of 60 and a number average molecular weight of 5,000.

Production Example 6

Production of Luster Color Pigment Paste C-1

Alpaste MH 8801 (product of Asahi Chemical Industry; aluminum pigment paste; 21 parts) was dissolved in 30 parts of 2-ethylhexyl glycol and then 10 parts of Primepol PX-1000 (product of Sanyo Chemical Industries; bifunctional polyether polyol), 5 parts of the above phosphoric acid group-containing acrylic resin and 0.3 part of lauryl acid phosphate were gradually added while stirring by means of a bench-top disper to give an aluminum-containing luster color pigment paste C-1.

Production Example 7

Production of Luster Color Pigment Paste C-2

Alpaste MH 8801 (product of Asahi Chemical Industry; aluminum pigment paste; 4.6 parts) was dissolved in 30 parts of 2-ethylhexyl glycol and then 10 parts of Primepol PX-1000, 38.0 parts of Cymel 204 (product of Mitsui Cytec; imino group-type melamine resin), 4.0 parts of the above phosphoric acid group-containing acrylic resin and 0.3 part of lauryl acid phosphate were gradually added while stirring by means of a bench-top disper to give an aluminum-containing luster color pigment paste C-2.

Production Example 8

Production of Luster Color Pigment Paste C-3

Iriodin NP Russet WII (product of Merck; 3.1 parts) and 3.8 parts of Iriodin 502 WII (product of Merck) were dissolved in 14 parts of a solution prepared by mixing methoxypropanol and deionized water in a ratio of 1:1 to give a mica-containing luster color pigment paste C-3.

Production Example 9

Production of Color Pigment Paste D-1

The water-soluble resin B-1 (67.0 parts), 23.2 parts of deionized water and 9.8 parts of Cinquacia Magenta BRT-343D (product of Ciba Specialty Chemicals) were mixed up preliminarily and then glass bead media were added in a paint conditioner and blending/dispersion was effected at room temperature for 1 hour to give a color pigment paste D-1 with a particle size of not more than 5 μm.

Production Example 10

Production of Color Pigment Paste D-2

The water-soluble resin B-1 (64.3 parts), 26.3 parts of deionized water and 9.4 parts of Perind Maroon R-6436 (product of Bayer) were treated in the same manner as in Production Example 8 to give a color pigment paste D-2 with a particle size of not more than 5 μm.

Production Example 11

Production of Color Pigment Paste D-3

The water-soluble resin B-2 (100.0 parts), 28.9 parts of deionized water, 0.3 part of dimethylaminoethanol and 5.1 parts of Degussa Carbon FW-285 (product of Degussa AG) were treated in the same manner as in Production Example 8 to give a color pigment paste D-3 with a particle size of not more than 5 μm.

Production Example 12

Production of Color Pigment Paste D-4

The water-soluble resin B-2 (50.0 parts), 17.9 parts of deionized water, 34.5 parts of rutile form titanium dioxide, 34.4 parts of barium sulfate, 6 parts of talc and 0.1 part of carbon black were treated in the same manner as in Production Example 8 to give a color pigment paste D-4 with a particle size of not more than 5 μm.

Production Example 13

Production of Polyester Resin E-1

A reaction vessel was charged with 22.3 parts of isophthalic acid, 19.9 parts of phthalic anhydride, 15.4 parts of adipic acid, 0.1 part of trimethylolpropane, 37.1 parts of neopentyl glycol, 5.2 parts of dimethylolpropionic acid and 0.1 part of dibutyltin oxide, and the mixture was heated to 170° C. with stirring. Then, while raising the temperature to 220° C. over 3 hours, the water resulting from the condensation reaction was removed. After attainment of an acid value of the solid matter of 25, the reaction mixture was cooled. After cooling to 80° C., 3.2 parts of dimethylethanolamine and 204.4 parts of deionized water were added to give a polyester resin E-1 with a nonvolatile matter content of 30%, an acid value of the solid matter of 25, a hydroxyl value of 28, a number average molecular weight of 4,000 and a weight average molecular weight of 14,000.

Production Example 14

Production of Alkyd Resin E-2

A reaction vessel was charged with 18.1 parts of isophthalic acid, 16.1 parts of phthalic anhydride, 12.5 parts of adipic acid, 7.7 parts of trimethylolpropane, 20.7 parts of neopentyl glycol, 5.7 parts of dimethylolpropionic acid, 19.2 parts of coconut oil and 0.1 part of dibutyltin oxide, and the mixture was heated to 170° C. with stirring. Then, while raising the temperature to 220° C. over 3 hours, the water resulting from the condensation reaction was removed and further water removal was effected azeotropically with an amount of xylene corresponding to 2% of the solid matter. After attainment of an acid value of the solid matter of 25, the reaction mixture was cooled. After cooling to 80° C., 3.3 parts of dimethylethanolamine and 206.9 parts of deionized water were added to give an alkyd resin E-2 with a nonvolatile matter content of 30%, an acid value of the solid matter of 25, a hydroxyl value of 28, a number average molecular weight of 4,000 and a weight average molecular weight of 14,000.

Example 1

The aqueous dispersion type resin A-1 (250.0 parts), 32.3 parts of the water-soluble resin B-1, 66.3 parts of the luster color pigment paste C-1, 25.3 parts of Cymel 204 and 1.7 parts of Adekanol SDX-1014 (product of Asahi Denka Kogyo; urethane compound, active ingredient content 30% by weight) were mixed up with stirring and the mixture was adjusted to pH 8 by adding a 10% (by weight) aqueous solution of dimethylaminoethanol. After attaining uniform dispersion, a water-borne coating composition 1 was obtained. This coating was diluted with deionized water to a viscosity of 45 seconds (measured at 20° C. using a No. 4 Ford cup). The application viscosity of this water-borne base coating was measured using a single cylindrical rotational viscometer (Tokyo Keiki model BM) at 6 rpm and at 25° C. and found to be 1,100 mPa·s.

Zinc phosphate-treated dull steel sheets, 300×400×0.8 mm in size, were coated with Powertop U-50 (Nippon Paint's cationic electrodeposition coating) by electrodeposition to a dry film thickness of 20 μm, and the coating films were baked at 160° C. for 30 minutes. Orga P-2 (Nippon Paint's melamine-curing type polyester resin-based gray intermediate coating) diluted in advance to a viscosity of 25 seconds (measured at 20° C. using a No. 4 Ford cup) was applied to those coated sheets to a dry film thickness of 35 μm in two stages by air spraying. The intermediate coating films were baked at 140° C. for 30 minutes and then cooled to give electrodeposition-coated substrates.

The above water-borne coating composition 1 was applied to the above substrate sheets in two stages to a dry film thickness of 15 μm using a Metallic Bell COPES-IV coater (ABB Industries' rotary atomizing electrostatic coater for water-based coatings) under conditions of room temperature (25° C.) and 85% humidity. Between the two applications, interval setting was effected for 1.5 minutes. After the second application, setting was effect for an interval of 5 minutes. Thereafter, preheating was performed at 80° C. for 3 minutes.

After preheating, the coated sheets were allowed to cool to room temperature, and the clear coating Orga TO-563 Clear (Nippon Paint's melamine-curing type acrylic resin-based clear coating) was applied thereto to a dry film thickness of 40 μm using a Micro-Micro Bell coater (ABB Ransburg's rotary atomizing electrostatic coater) in one stage, followed by 7 minutes of setting. The coated sheets obtained were further baked at 140° C. in a hot air drying oven for 30 minutes. Multilayer coating films were thus formed on the substrates.

Example 2

A water-borne coating composition 2 was prepared in the same manner as in Example 1 except that Adekanol SDX-1014 was used in an amount of 3.3 parts. The application viscosity of the coating thus obtained was measured in the same manner as in Example 1 and found to be 1,200 mPa·s. Further, the water-borne coating composition 2 and the clear coating were applied to the above substrates and the coatings were baked in the same manner as in Example 1 to give multilayer coating films on the substrates.

Example 3

A water-borne coating composition 3 was prepared in the same manner as in Example 1 except that 3.3 parts of Adekanol UH-750 (product of Asahi Denka Kogyo; urethane compound, active ingredient content 30% by weight) was added in lieu of Adekanol SDX-1014. The application viscosity of the coating thus obtained was measured in the same manner as in Example 1 and found to be 1,100 mPa·s. Further, the water-borne coating composition 3 and the clear coating were applied to the above substrates and the coatings were baked in the same manner as in Example 1 to give multilayer coating films on the substrates.

Example 4

A water-borne coating composition 4 was prepared in the same manner as in Example 1 except that the aqueous dispersion resin A-2 was used in lieu of the aqueous dispersion type resin A-1 and that Adekanol SDX-1014 was used in an amount of 3.3 parts. The application viscosity of the coating thus obtained was measured in the same manner as in Example 1 and found to be 2,500 mPa·s. Further, the water-borne base coating 4 and the clear coating were applied to the above substrates and the coatings were baked in the same manner as in Example 1 to give multilayer coating films on the substrates.

Example 5

The aqueous dispersion type resin A-1 (108.3 parts), 86.9 parts of the luster color pigment paste C-2, 20.9 parts of the luster color pigment paste C-3, 81.9 parts of the color pigment paste D-1, 85.3 parts of the color pigment paste D-2 and 1.5 parts of Adekanol SDX-1014 were mixed up with stirring and the mixture was adjusted to pH 8 by adding a 10% (by weight) aqueous solution of dimethylaminoethanol. After attainment of uniform dispersion, a water-borne coating composition 5 was obtained. The application viscosity of the coating thus obtained was measured in the same manner as in Example 1 and found to be 2,300 mPa·s. Further, the water-borne coating composition 5 and the clear coating were applied to the above substrates and the coatings were baked in the same manner as in Example 1 to give multilayer coating films on the substrates.

Example 6

A water-borne coating composition 6 was prepared in the same manner as in Example 1 except that 125.0 parts of the aqueous dispersion type resin A-1 and 100.0 parts of the polyester resin E-1 were used in lieu of 250.0 parts of the aqueous dispersion type resin A-1. The application viscosity of the coating thus obtained was measured in the same manner as in Example 1 and found to be 1700 mPa·s. Further, the water-borne coating composition 6 and the clear coating were applied to the above substrates and the coatings were baked in the same manner as in Example 1 to give multilayer coating films on the substrates.

Example 7

A water-borne coating composition 7 was prepared in the same manner as in Example 6 except that the alkyd resin E-2 was used in lieu of the polyester resin E-1. The application viscosity of the coating thus obtained was measured in the same manner as in Example 1 and found to be 1900 mPa·s. Further, the water-borne coating composition 7 and the clear coating were applied to the above substrates and the coatings were baked in the same manner as in Example 1 to give multilayer coating films on the substrates.

Example 8

The aqueous dispersion type resin A-1 (145.8 parts), 4.0 parts of the water-soluble resin B-1, 116.4 parts of the color pigment paste D-3, 22 parts of 2-ethylhexyl glycol, 10 parts of Primepol PX-1000, 38.0 parts of Mycoat XM-2541, 0.3 part of lauryl acid phosphate and 5.5 parts of Adekanol SDX-1014 were mixed up with stirring and the mixture was adjusted to pH 8 by adding a 10% (by weight) aqueous solution of dimethylaminoethanol to give a uniformly dispersed water-borne coating composition 8. The coating thus obtained was diluted with deionized water to a viscosity of 30 seconds (measured at 20° C. using a No. 4 Ford cup) followed by application to the electrodeposition-coated substrates in two stages to a dry film thickness of 35 μm by air spraying under conditions of room temperature (25° C.) and 85% humidity. Between the two applications, interval setting was effected for 1.5 minutes. After the second application, setting was effect for an interval of 5 minutes. Thereafter, the coatings were baked at 150° C. for 30 minutes to give coating films on the substrates.

Example 9

The water-soluble resin B-2 (55.0 parts), 142.9 parts of the color pigment paste D-4, 22.5 parts of hexamethoxymethylolmelamine, 0.3 part of p-toluenesulfonic acid, 1.5 parts of Adekanol SDX-1014 and 80.0 parts of deionized water were mixed up with stirring to give a water-borne coating composition 9. Further, the water-borne coating composition 9 was applied to the electrodeposition-coated substrates and the coatings were baked in the same manner as in Example 8 to give coating films on the substrates.

Comparative Example 1

A water-borne coating composition 10 was prepared in the same manner as in Example 1 except that Adekanol SDX-1014 was not added. The application viscosity of the coating thus obtained was measured in the same manner as in Example 1 and found to be 950 mPa·s. Further, the water-borne coating composition 10 and the clear coating were applied to the substrates and the coatings were baked to give a multilayer coating film on the substrates.

Comparative Example 2

A water-borne coating composition 11 was prepared in the same manner as in Example 1 except that 3.3 parts of Adekanol UH-420 (product of Asahi Denka Kogyo; urethane compound having highly hydrophobic molecular termini, active ingredient content 30% by weight) was used in lieu of Adekanol SDX-1014. The application viscosity of the coating thus obtained was measured in the same manner as in Example 1 and found to be 1,000 mPa·s. Further, the water-borne coating composition 11 and the clear coating were applied to the substrates and the coatings were baked to give a multilayer coating film on the substrates.

Comparative Example 3

A water-borne coating composition 12 was prepared in the same manner as in Example 1 except that 70.0 parts of Adekanol SDX-1014 was added. The application viscosity of the coating thus obtained was measured in the same manner as in Example 1 and found to be 2,450 mPa·s. Further, the water-borne coating composition 12 and the clear coating were applied to the substrates and the coatings were baked to give a multilayer coating film on the substrates.

Comparative Example 4

A water-borne coating composition 13 was prepared in the same manner as in Example 5 except that Adekanol SDX-1014 was not added. The application viscosity of the coating thus obtained was measured in the same manner as in Example 1 and found to be 2,100 mPa·s. Further, the water-borne coating composition 13 and the clear coating were applied to the substrates and the coatings were baked to give a multilayer coating film on the substrates.

Comparative Example 5

A water-borne coating composition 14 was prepared in the same manner as in Example 8 except that Adekanol SDX-1014 was not added. Further, the water-borne coating composition 14 was applied to the substrates and the coatings were baked to give coating films on the substrates in the same manner as in Example 8.

Comparative Example 6

A water-borne coating composition 15 was prepared in the same manner as in Example 9 except that Adekanol SDX-1014 was not added. Further, the water-borne coating composition 15 was applied to the substrates and the coatings were baked to give coating films on the substrates in the same manner as in Example 8.

Evaluation Tests

The water-borne coating compositions 2 and 10 obtained in Example 2 and Comparative Example 1, respectively, were evaluated for their viscosity behaviors versus the shear rate (shear). Further, the multilayer coating films obtained in Examples 1 to 9 and Comparative Examples 1 to 6 were evaluated for appearance and smoothness by visual observation. The evaluation results are shown in Table 1. In the table, the symbol "–" indicates that no evaluation test was made.

<Viscosity Behavior>

Figure 1:
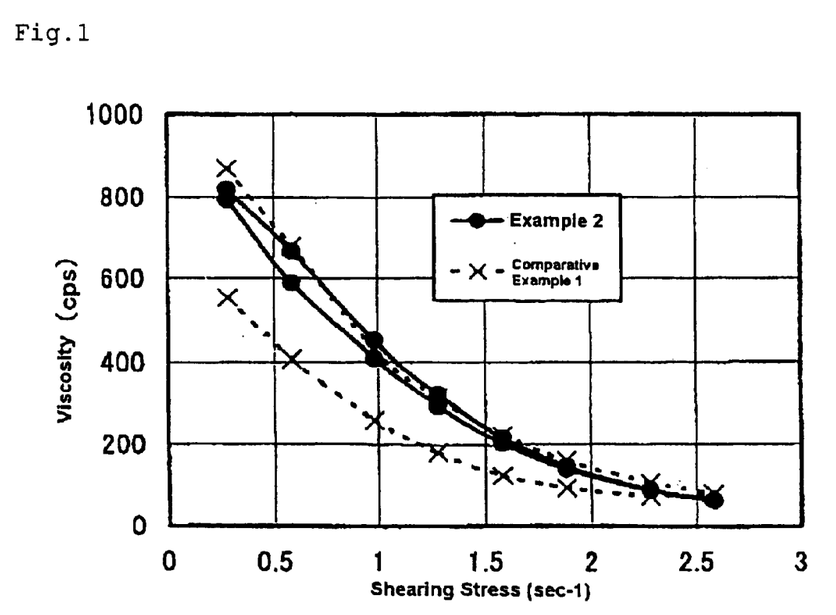
FIG. 1 graphically shows the viscosity behaviors of the water-borne coating compositions 2 and 10 prepared in Example 2 and Comparative Example 1, respectively.

The water-borne coating compositions 2 and 10 obtained in Example 2 and Comparative Example 1, respectively, were measured for their viscosity behaviors at 25° C. using a model R series 500 viscometer (Toki Sangyo's conical rotary viscometer; 1.34-degree cone). As for the measurement method, 0.5 rpm was taken as the starting point and, after 1 minute, the viscosity was measured. The rotational rate was increased and one minutes after fixed at 1 rpm, the viscosity was measured. The rotation rate was further increased and one minute after fixed at 2.5 rpm, the viscosity was measured. In this manner, viscosity measurements were carried out at each rotational rate of 0.5 rpm, 1 rpm, 2.5 rpm, 5 rpm, 10 rpm, 20 rpm, 50 rpm and 100 rpm. Further, 100 rpm was taken as the starting point and the rotational rate was decreased in reverse order and viscosity measurements were carried out at each of the same rotational rate as mentioned above. The thus-obtained viscosity behaviors are shown in FIG. 1.

<Coating Film L Value>

The multilayer coating films obtained from the compositions of Examples 1 to 4, 6 and 7 and Comparative Examples 1 to 3 were evaluated for coating film whiteness by measuring coating film L values using a CR-300 color difference meter (product of Minolta).

<Flip-flop Property>

The multilayer coating films obtained in Examples 1 to 4 and Examples 6 and 7 as well as in Comparative Examples 1 to 3 were measured for their IV values using an IV meter (product of Kansai Paint) for flip-flop property evaluation. Values not less than 200 were regarded as satisfactory.

<Smoothness>

(1) Surface Roughness

The coating films obtained by using the water-borne coating composition 2 of Example 2 and the water-borne coating composition 10 of Comparative Example 1 were evaluated for surface roughness by measuring Ra values using Surfcom 110B (Tokyo Seimitsu's surface roughness/shape measuring apparatus) (cutoff 0.8 mm). When Ra was not more than 0.3 μm, the result was regarded as satisfactory. The results obtained are shown in Table 1.

(2) Surface Condition

The surface condition of each of the multilayer coating films and coatings obtained is Examples 1 to 9 and Comparative Examples 1 to 6 was evaluated by visual observation. The results obtained are shown in Table 1. The following evaluation criteria were used.

TABLE 1

Evaluation Results

| | | Example | | | | | | | | | Comparative Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Application Viscosity (mPa · s) | | 1100 | 1200 | 1100 | 2500 | 2300 | 1700 | 1900 | — | — | 950 | 1000 | 2450 | 2100 | — | — |
| Condition of aluminum in coating films | | 5 | 4 | 4 | 4 | 4 | 5 | 5 | — | — | 3 | 2 | 2 | 2 | — | — |
| Coating film L value | | 92 | 94 | 92 | 94 | — | 95 | 96 | — | — | 86 | 90 | 91 | — | — | — |
| Flip flop property (IV value) | | 220 | 215 | 210 | 218 | — | 225 | 228 | — | — | 190 | 180 | 160 | — | — | — |
| smoothness | Surface roughness Ra (μm) | — | 0.22 | — | — | — | — | — | — | — | 0.42 | — | — | — | — | — |
| | Surface condition | ◎ | ◎ | ○ | ◎ | ○ | ○ | ◎ | ○ | ○ | X | XX | Δ | X | X | X |

◎: Smooth
○: Generaly good although some large rounds are seen.
Δ: Large rounds are seen
X: Large rounds are seen, along with some small rounds.
XX: There are large rounds as well as small rounds.

<Condition of Aluminum in Coating Films>

The multilayer coating films obtained in Examples 1 to 7 and Comparative Examples 1 to 4 were evaluated by visual observation.

The following evaluation criteria were used and, when given a score of at least 4, the coating film in question was regarded as satisfactory.

5: Aluminum in the coating film looks uniform.
4: Some small aggregates of aluminum particles are seen.
3: Small aggregates of aluminum particles are seen.
2: Some large aggregates of aluminum particles are seen.

As can be seen from FIG. 1, the water-borne coating compositions containing the specific emulsion resin and the urethane compound of specific structure as well as the water-borne coating composition resin containing the specific hydrophilic polyester and the urethane compound of specific structure show little hysteresis and are stable against viscosity changes due to changes in shearing stress. On the contrary, the water-borne coating composition of Comparative Example 1 shows significant hysteresis and is unstable with respect to viscosity changes due to changes in shearing stress.

As can be seen from Table 1, the water-borne coating compositions containing the emulsion resin or water-soluble polyester resin and the urethane compound of specific structure give coatings films very excellent in film appearance and smoothness. Furthermore, when they contain a flake-like luster color pigment, the water-borne coating compositions can increase the whiteness of coating films and the flip-flop property by its further containing a polyester resin and/or an alkyd resin.

What is claimed is:

1. A water-borne coating composition comprising
an emulsion resin obtained by emulsion polymerization of an α,β-ethylenically unsaturated monomer mixture comprising not less than 65% by weight of a (meth)acrylate ester whose ester-forming moiety contains 1 or 2 carbon atoms and having an acid value of 3 to 50 and
a urethane compound represented by the general formula (1) or (2):

(1)

(2)

in formulas, $R^1$, $R^2$, $R^3$, $R^4$ and $R^5$ may be the same or different and each represents a hydrocarbon group, $R^1$ represents a hydrocarbon group which may optionally have a urethane bond, $R^3$ represents a branched or secondary hydrocarbon group, n is a number not less than 2, j is a number not less than 1 in the general formula (1) or a number not less than 2 in the general formula (2) and k and m each is a number within the range of 1 to 500,
wherein the content of said urethane compound is 0.01 to 20% by weight on the solid basis relative to the resin solid in the coating composition.

2. A water-borne coating composition comprising
a water-borne resin resulting from dissolving or dispersing a resin having an acid value of 10 to 100, a hydroxyl value of 30 to 200 and a weight average molecular weight of 4,000 to 2,000,000 in an aqueous medium by means of a neutralizing base and
a urethane compound represented by the general formula (1) or (2):

(1)

(2)

in formulas, $R^1$, $R^2$, $R^3$, $R^4$ and $R^5$ may be the same or different and each represents a hydrocarbon group, $R^1$ represents a hydrocarbon group which may optionally have a urethane bond, $R^3$ represents a branched or secondary hydrocarbon group, n is a number not less than 2, j is a number not less than 1 in the general formula (1) or a number not less than 2 in the general formula (2) and k and m each is a number within the range of 1 to 500,
wherein the content of said urethane compound is 0.01 to 20% by weight on the solid basis relative to the resin solid in the coating composition.

3. The water-borne coating composition according to claim 1,
wherein, in the general formula (1) or (2), $R^2$ and $R^5$ may be the same or different and each is an alkylene group containing 2 to 4 carbon atoms or a phenylethylene group.

4. The water-borne coating composition according to claim 1,
wherein, in said general formula (1) or (2), $R^3$ is a branched or secondary alkyl group containing 8 to 36 carbon atoms.

5. The water-borne coating composition according to claim 1,
which comprises a color component.

6. The water-borne coating composition according to claim 1,
which comprises a polyether polyol having not less than 0.02, on average, of a primary hydroxyl group per molecule, a number average molecular weight of 300 to 3,000 and a water tolerance value of not less than 2.0.

7. The water-borne coating composition according to claim 6,
wherein said polyether polyol has at least one primary hydroxyl group per molecule and a hydroxyl value of 30 to 700.

8. The water-borne coating composition according to claim 6,
wherein said polyether polyol has at least 3 hydroxyl groups per molecule.

9. The water-borne coating composition according to claim 1,
which comprises a polyester resin and/or an alkyd resin.

10. A method of forming a multilayer coating film comprising:
applying a water-borne base coating to an article to be coated and then applying a clear coating thereonto, followed by curing by heating,
wherein said water-borne base coating is the water-borne coating composition according to claim 5.

11. The method of forming a multilayer coating film according to claim 10,
wherein said color component is a color pigment and/or a luster color pigment.

12. The method of forming a multilayer coating film according to claim 10,
wherein said water-borne base coating has an application viscosity at 25° C. of 500° C. to 5000 mPa·s as determined on a single cylindrical rotational viscometer at 6 rpm.

13. A multilayer coating film obtainable by the method according to claim 9.

14. The water-borne coating composition according to claim 2,
wherein, in the general formula (1) or (2), $R^2$ and $R^5$ may be the same or different and each is an alkylene group containing 2 to 4 carbon atoms or a phenylethylene group.

15. The water-borne coating composition according to claim 2,
wherein, in said general formula (1) or (2), $R^3$ is a branched or secondary alkyl group containing 8 to 36 carbon atoms.

16. The water-borne coating composition according to claim 3, wherein, in said general formula (1) or (2), $R^3$ is a branched or secondary alkyl group containing 8 to 36 carbon atoms.

17. The water-borne coating composition according to claim 2, which comprises a color component.

18. The water-borne coating composition according to claim 3, which comprises a color component.

19. The water-borne coating composition according to claim 4, which comprises a color component.

20. The water-borne coating composition according to claim 2, which comprises a polyether polyol having not less than 0.02, on average, of a primary hydroxyl group per molecule, a number average molecular weight of 300 to 3,000 and a water tolerance value of not less than 2.0.

* * * * *